(12) United States Patent
Wilksch et al.

(10) Patent No.: US 6,334,385 B1
(45) Date of Patent: Jan. 1, 2002

(54) PISTON LUBRICATION AND COOLANT PATH

(75) Inventors: Mark Conrad Wilksch, Buckingham Bucks; Philip Clive Franklin, Bicester, both of (GB)

(73) Assignee: Seneca Technology, Ltd. (KN)

( * ) Notice: Subject to any disclaimer, the term of this patent is extended or adjusted under 35 U.S.C. 154(b) by 0 days.

(21) Appl. No.: 09/552,267

(22) Filed: Apr. 19, 2000

(30) Foreign Application Priority Data

Apr. 19, 1999 (GB) .............................................. 9909033

(51) Int. Cl.$^7$ ................................ F01B 31/10; F16J 1/14
(52) U.S. Cl. ................................ 92/159; 92/186; 92/188
(58) Field of Search ........................... 92/158, 159, 186, 92/187, 188

(56) References Cited

U.S. PATENT DOCUMENTS 2,317,004 A * 4/1943 Wallgren et al. ............... 92/187
4,662,319 A * 5/1987 Ayoul ........................ 123/41.35

* cited by examiner

Primary Examiner—Edward K. Look
Assistant Examiner—Michael Leslie

(57) ABSTRACT

In a piston and connecting rod assembly, for an internal combustion engine with a spherical connecting rod small-end entrained in a hollow piston body by a retention ring, a chamber serving as a localized reservoir for lubricant and/or coolant (oil) is incorporated in the underside of a piston crown along with passages or grooves communicating between the reservoir and a coolant gallery in the piston crown for continuous interchange of lubricant (such as oil) between gallery and reservoir and then lubricant return, over small end (upper and lower) part-spherical bearing surfaces to the retention ring and through lubricant passages in the ring to an engine crankcase, thereby affording an overall circulatory, lubricant feed and drainage path.

15 Claims, 2 Drawing Sheets

PISTON LUBRICATION AND COOLANT PATH

TECHNICAL FIELD

This invention relates to component lubrication and/or cooling, in a reciprocatory, piston-in-cylinder device and is particularly concerned with lubrication of a piston, connecting rod and associated small-end joint and bearing assembly for an internal combustion engine.

BACKGROUND

The provision of separate fluids for dedicated lubrication and cooling is well-known. There also is typically some overlap, duality, or cooperative interaction, between lubrication and coolant roles. Some lubricants, such as oil, provide lower surface contact friction and transport heat between components differentiated by a temperature gradient.

Heat transfer to the lubricant/coolant is generally initially by conduction and convection, whereupon the lubricant/coolant is moved bodily to a cooler station, perhaps even a dedicated heat exchanger, such as an oil cooler radiator matrix, to give up its heat, allowing for return of cooler lubricant/coolant. For a heat or thermodynamic cycle engine, in the conversion of combustion heat energy into useful mechanical work output, considerable heat wastage arises, which must be disposed of, otherwise excessive local temperatures and attendant thermal stresses may lead to material and component failure.

A piston is a critical internal combustion (IC) engine component, in direct contact with intense combustion heat. Piston lubrication and cooling is particularly critical for heavy-duty operation, such as with high b.m.e.p., two-stroke, compression-ignition (diesel) engines. Special (hollow) piston configurations, with internal coolant galleries and pathways, have been proposed to address this. See, for example, pending UK application No. 9909034.2 which relates to certain piston coolant gallery refinements.

Aspects of the present invention are applicable to both air cooled and water cooled engines; to both spark-ignition (petrol, gasoline or gas) and compression-ignition (diesel) combustion modes and fuels; and to both two-stroke and four stroke combustion cycles.

Typically, in the majority of spherically-jointed, piston-connecting rod assemblies in IC engines, lubricant (oil) for joint and piston cooling is passed through crankshaft passages, or oil-ways, and along a passage, or oil-way, in the connecting rod itself, and collected in a central cavity in a (hollow) piston body, around the connecting rod small end.

SUMMARY OF THE INVENTION

Aspects of the present invention address the provision of lubricant (oil) to a spherical small end joint and attendant piston cooling. It is to be understood, however, that the present invention is broadly applicable to other small end joint configurations, such as those envisaged in the Applicants co-pending UK patent application no. 9908844.5 on piston retention.

According to one aspect of the invention, a (hollow) piston, has a localized lubricant (oil) and/or coolant reservoir, configured as a (central) piston cavity, with one or more passages or grooves, in a (part)spherical, {or (part-) cylindrical} under-crown surface, communicating, though one or more passages, pathways, or oil-ways, with an integrated coolant gallery. In practice, such passages or grooves in the piston under-crown ensure that the upper portion of the small end joint is provided with a supply of "fresh" (i. e. cooler) lubricant, under pressure, whilst carrying lubricant to the integral piston coolant gallery. Provision of a plentiful lubricant supply reduces the wear rate and the risk of scuffing and galling, and carries away any wear debris.

Various groove (cross-sectional) profiles, contours, positions and layouts may be employed consistent with preservation of simple or practical (i.e. not overly convolute) lubricant (oil) flows and manufacturing simplicity, economy, quality and consistency. Thus, for example, (part) spiral, or helical, forms could be employed.

Relatively small diameter passages, pathways, or oil-ways, can be adopted—in the feed and/or return paths—in order to optimize lubricant (oil) flow into the piston gallery. In practice, some form of (flow) restriction may be desirable, otherwise the capacity of a lubricant (oil) pump in an engine (re-)circulatory lubricant system would have to be enlarged considerably in order to maintain an adequate lubricant (oil) supply pressure to the bearings. Such flow restriction could be an orifice or passages connected over some part only of each engine cycle.

The piston could be cast in aluminum alloy with a steel connecting rod, although other suitable materials could be used.

BRIEF DESCRIPTION OF THE DRAWINGS

There now follows a description of some particular embodiments of the invention, by way of example only, with reference to the accompanying diagrammatic and schematic drawings, in which.

DESCRIPTION OF THE PREFERRED EMBODIMENT(S)

Figure 1:
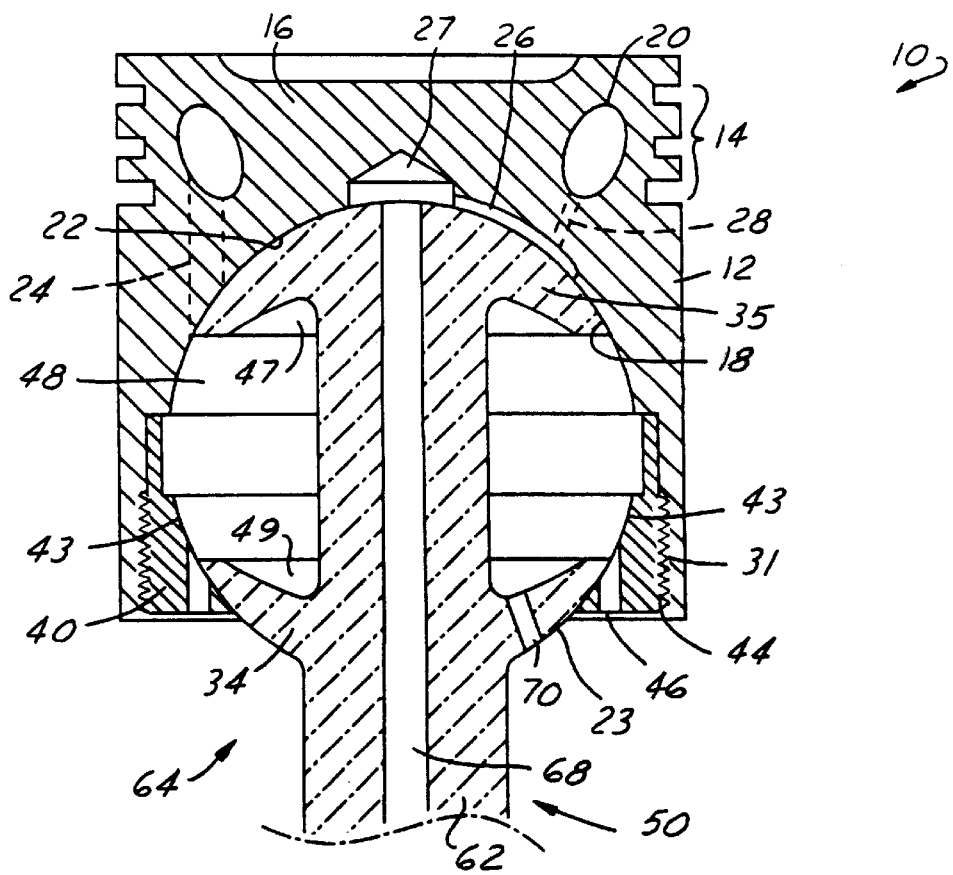
FIG. 1 shows a part-sectioned, part cutaway view of a piston and connecting rod assembly.

The terms "lubrication" or "lubricant" are used herein generally to embrace interaction of surfaces in relative motion, generally with the provision of an intervening fluid, with low friction characteristics. Low-friction contact generates less heat and attendant material and surface degradation and wear, particular in a climate heated by combustion effects.

The terms "cooling" or "coolant" are used herein generally to embrace the transfer of heat, typically through a heat transfer fluid (e.g. liquid) medium, across a temperature gradient.

The terms "upper" and "lower" relate only to relative positions of components, as shown in the accompanying drawings. Similarly, "small end" simply reflects a convention for identifying location or association with a piston, rather than necessarily absolute, or relative, size of a joint, or attendant bearing.

In engine operation, the components may be arranged in any position or orientation which is consistent with satisfactory provision of combustion intake and exhaust, fuel, coolant and lubricant conditions and flows.

Referring to the drawings, a piston and connecting rod assembly comprises a piston 10 and a connecting rod 50 with a (part-) spherical small end 64. The piston 10 has an upper (in this example recessed) head or crown 16 surmounting a hollow piston body to receive a connecting rod small end 64 and bounded by a peripheral skirt 12. The piston crown 16 has a complementary part-spherical underside profile 18 with the part-spherical profile of an upper bearing surface 22 on an upper portion 35 of the small end 64.

The piston crown 16 is bounded by a peripheral ring belt 14 to accommodate piston expansion and wear rings for cylinder wall contact (not shown). In the region of the ring belt 14, the piston crown 16 incorporates an (integrated) annular coolant gallery 20, desirably configured as an at least partially closed loop that is at least a horseshoe shape. The piston skirt 12 is of progressively tapering thickness toward its lower end, which incorporates an internal circumferential thread 31.

An annular unitary piston retainer or retention ring 40 has a (part-)spherical (upper) bearing surface 43, to complement the part-spherical bearing surface 23 on the underside of a lower portion 34 of the small end 64. The retention ring 40 also has an external peripheral retaining thread 44, to mate with the piston body thread 31. The connecting rod 50 has a shank 62 with a central passage or oil-way 68 communicating between a big end bearing and crankshaft lubricant pathway (not shown) and the small end 64.

The piston body is generally axially-symmetric except for various co-operatively communicating lubricant (oil) feed and drainage, passages, pathways or oil-ways 28, 24, serving the integrated piston coolant gallery 20.

Operationally, lubricant (oil) collects heat from the internal surfaces of the gallery 20, as it is violently thrown up and down, "cocktail-shaker" fashion, by the reciprocatory piston motion. Lubricant (oil) feeds to and drains from the gallery 20 through various passages or oil-ways 28, 24, into a (central) cavity or retention ring gallery 48 of the hollow piston body. The drainage passages 24 and (optionally) also the feed passages 28 are selectively (at least partially) obstructed or blocked, in certain angular orientations of the small end 64 in relation to the piston body. A regulating or control valve action in relation to the interconnection of the coolant gallery 20 with the overall engine lubricant oil (re)circulatory system is thus achievable between piston 10 and connecting rod 50 as the small end swivels in the hollow piston body.

The upper portion 35 of the small end 64 and the position and size of the drainage passages, such as 24, are configured and disposed co-operatively, such that at least some of the drainage passages are (partially) closed at the ends of the stroke. This is the condition at top and bottom dead center piston positions, as depicted in FIG. 1. This ensures that sufficient oil remains in the coolant gallery 20 to provide effective cooling, yet the drainage passages, such as 24, can be of substantial size and hence can be easily cast into the piston, if required.

Figure 3:
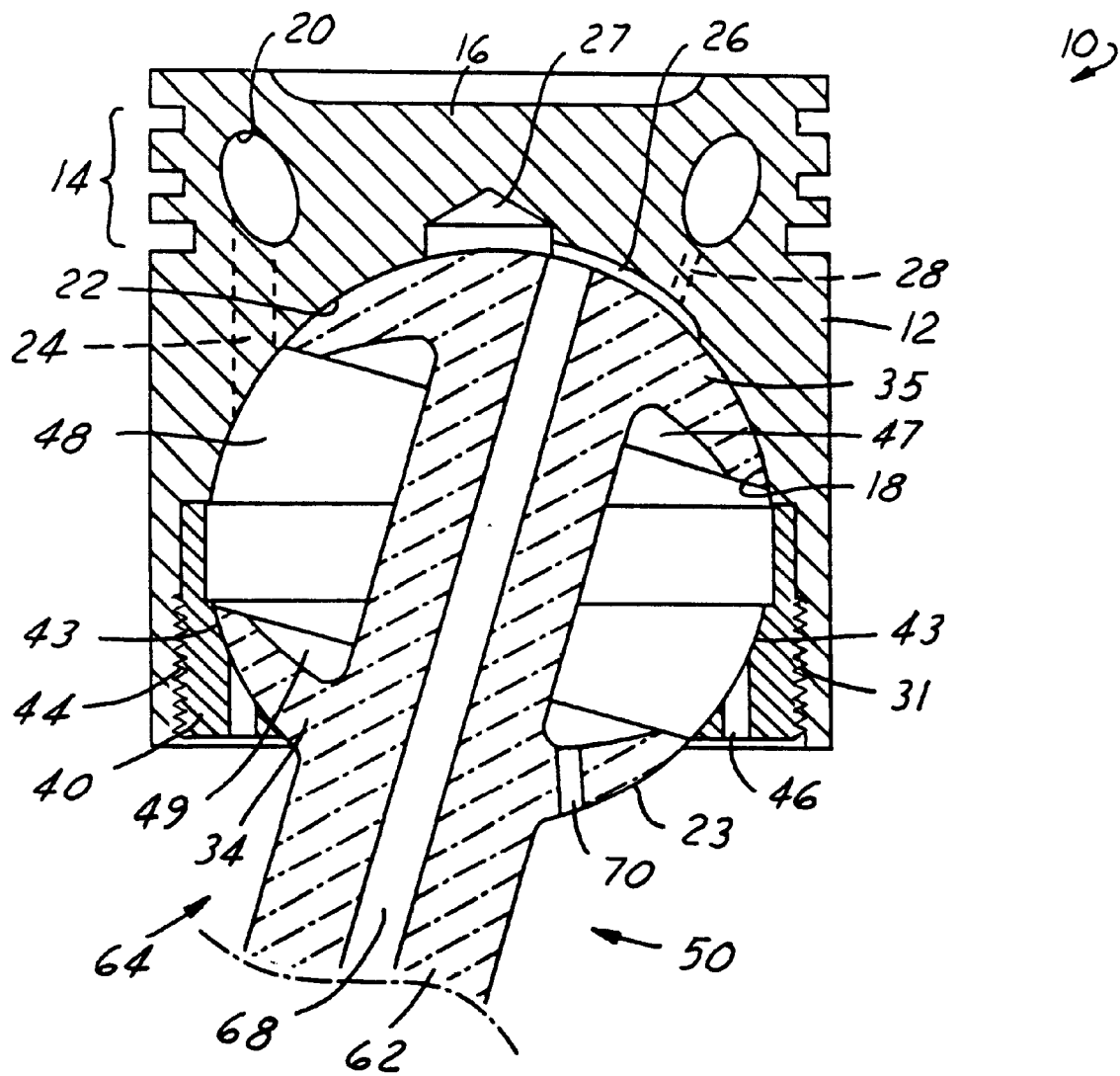
FIG. 3 shows the a part-sectioned, part cut-away view of the piston and connecting rod assembly of FIGS. 1 and 2, with the connecting rod canted angularity to expose coolant gallery drainage passages in the piston crown.

As depicted in FIG. 3, the coolant gallery 20 is re-connected, or full (inter)connection restored to a return path over the small end 64 into the overall lubricant (re-) circulatory system once the connecting rod 50 swings angularly as the piston traverses between opposed top and bottom dead center positions. Preferably, at least three distinct (feed and/or drainage) passages or oilways 28, 24 are provided to ensure that the relative (angular) motion between the connecting rod 50 and the piston 10 opens, or exposes, at least one. Generally, the intention is to preserve lubricant feed and selectively inhibit lubricant oil drainage—so that there remains a certain pool or reservoir of lubricant in the coolant gallery and a periodic exchange or substitution of heated lubricant by cooler lubricant.

A restrictor or throttle action (not shown) can also be achieved in the connection of the feed or supply passages 28 to the coolant gallery 20 in order to limit the supply of lubricant oil thereto and avoid excessive demand on the overall lubricant oil (re)circulatory system and associated lubricant oil pump. In this example, FIGS. 1 and 3 depict preservation of communication between the coolant gallery and the (central) reservoir 27 through the grooves 26 and the feed passages 28 throughout the piston reciprocatory movement cycle. However, the upper end of the lubricant supply passage 68 in the connecting rod 50 may be, at least partially, obstructed by angular offset from the (central) reservoir 27 once some relative angular displacement occurs, as depicted in FIG. 3.

In an alternate embodiment, some or all of the (closed cross-section) drainage passages 24 are replaced with one or more annular (open cross-section) slots or grooves (not shown). Individual such slots could extend over, or subtend, part or all of a 360 degree angular arc and thereby substantially increasing the effective vertical dimension of the gallery 20. The upper portion 35 of the small end 64 substantially closes off the slots in order to prevent the gallery 20 from being depleted of oil.

Overall, the present invention ensures that the gallery is partially filled in operation, maximizing heat transfer by coolant transfer motion.

If the drainage holes were not (at least partially) closed by the connecting rod 50, they would have to be considerably smaller, otherwise there would be too little oil in the gallery 20 for adequate cooling. Larger section passages are generally somewhat easier to create, whether cast or drilled, and if cast enable stronger supports to be used to hold a gallery core in place during casting. In foundry casting practice, gallery cores need to be supported in at least two or preferably three places upon pins of adequate diameter (typically at least 5mm). The resulting cast holes are then drilled through to ensure cleanliness, consistency and adequacy of cross-section, and to assist in removal of a (salt) casting core. If the holes were not obscured in this manner by the small end of the connecting rod, at least one of them would need to be plugged (at extra cost and complexity) to achieve optimum cooling.

A (central) cavity 48 at the small end 64 and within the hollow piston body is defined and bounded by the (part-) spherical small end 64 of the connecting rod 50 between upper and lower portions 35, 34 respectively; and by the inner surfaces of the piston under-crown 18 and skirt 12 and the retaining ring 40.

In practice, in order to reduce as much weight as possible, a maximum amount of material is removed from the connecting rod small end 64 leaving part-spherical upper and lower (land) portions 35, 34, respectively, with associated (part-)spherical bearing surfaces 22, 23. At the same time, however, sufficient material is left for adequate strength for operation, sufficient bearing area, and ease of manufacturing. Undercuts 47 and 49 in upper and lower portions 35 and 34, respectively, of the connecting rod small end 64, as shown in FIG. 1, contribute to reduced weight and also serve as (intermediate) local lubricant (oil) reservoirs.

The region of the small end 64 between upper and lower portions 35, 34 can be largely removed beyond the central stem of the connecting rod shank 62, leaving opposed, "mushroom-shaped" portions with an intervening central cavity 48 bounded by the hollow piston body and the retaining ring. Lubricant (oil) trapped in the central cavity (or retention ring gallery) 48 affords a secondary lubricant (oil) coolant provision.

Lubricant (oil) drains into the cavity 48 from the piston gallery 20 along drain passages 24 and from the bearing clearance between the part-spherical piston undercrown surface 18 and connecting rod upper (part-)spherical surface 22. Lubricant (oil) is violently agitated in this space in much the same way as in the piston gallery 20 itself by piston reciprocatory motion, again promoting substantial heat transfer.

Figure 2:
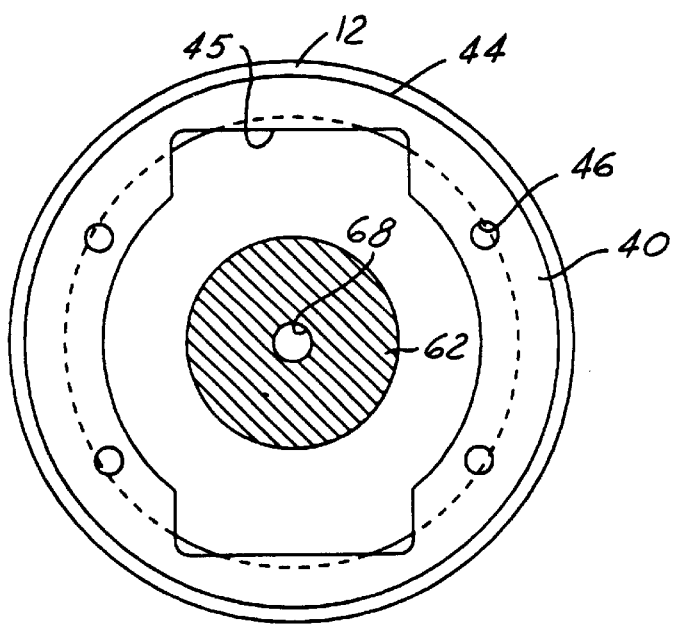
FIG. 2 shows an underside view of a retainer ring installed below the small end joint of the piston and connecting rod assembly of FIG. 1.

From the cavity 48, lubricant oil drains through drain holes 46 in the piston retaining ring 40 and also through the bearing clearance between the piston retaining ring 40 upper part-spherical surface 43 and the connecting rod lower part-spherical surface 23. Drainage also occurs around localized cut-outs in a internal profiled aperture 45 of the retaining ring 40 as shown in FIG. 2, and (optionally) through one or more additional holes 70, if provided.

For an inverted engine, one or more (through) holes or passages, such as 46, 70, could ensure that residual oil draining from the crankcase or (cylinder) bores after shutdown returns to the space or region 48 rather than proceeding along the skirt 12 with a resultant chance of hydraulic lock of the engine.

The position and size of feed and return passages 28, 24 to the coolant gallery 20 are such as to achieve a reduced pathway for the passage of lubricant (oil) at opposite ends of the piston stroke. This ensures that there is an adequate quantity of oil trapped in the (central) cavity 27 for cooling. The oil trapped in the (central) cavity 48 also acts as a reservoir to ensure that the lower part 34 of the connecting rod small end 64 is well-lubricated. searing loading upon the small end joint 64 lower part 34 is much less than for the upper joint part 35 and so does not require pressure lubrication.

Generally, in the supply mode, oil passes from the engine's crankshaft (not shown), via the big end bearing (not shown), up the central passage 68 of the connecting rod shank 62 and to the chamber 27 in the underside 18 of the piston crown 16. From this chamber 27, grooves 26 distribute oil out to (relatively small cross-section) feed passages 28 to the integral piston coolant gallery 20 and ensure that the connecting rod small end 64 upper portion 35 is well lubricated. Lubricant (oil) passed through the (feed) passages 28 into the coolant gallery 20 is vigorously shaken up and down by the reciprocatory piston movement thereby collecting heat from internal gallery surfaces.

In the return mode, lubricant (oil) passes down the (relatively large cross-section) drain passages 24 escaping past the upper part 35 of the small end 64 into a central cavity or retention ring gallery 48. More heat is collected by, or given up to, the oil in the gallery 48 as it is shaken up and down in this space before the lubricant (oil) escapes down lower drain holes 46 in the retaining ring 40 away into the crankcase (not shown) and also via one or more holes 70, if provided. Also, some oil will escape past the small end lower bearing spherical surface 23 of the lower portion 35 of the small end 64 and lubricating these surfaces as it does so.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A piston for an internal combustion engine with a crankcase, said piston comprising:
    a body member having a first spherical cavity therein and a smaller coolant chamber thereon;
    a groove in the surface of said cavity; and
    at least a first passageway communicating said groove with a cooling gallery;
    wherein lubricant introduced into said chamber passes into said groove and through said first passageway to said gallery.

2. The piston for an internal combustion engine as recited in claim 1 further comprising a second passageway communicating said cavity with said cooling gallery, said second passageway being larger in size than said first passageway in order to allow the lubricant to drain more easily therefrom.

3. The piston for an internal combustion engine as recited in claim 2 wherein said first and second passageways are positioned in said cavity such that the relative angular displacement of a connecting rod mounted in said cavity selectively exposes or obstructs at least one of said first and second passageways in order to selectively allow flow of lubricant therethrough.

4. The piston for an internal combustion engine as recited in claim 1 further comprising a connecting rod, said connecting rod having a spherical end member positioned in said cavity.

5. The piston for an internal combustion engine as recited in claim 4 further comprising a retaining ring positioned on said body member and retaining said connecting rod in said piston cavity.

6. The piston for an internal combustion engine as recited in claim 4 further comprising at least a second coolant chamber in said end member of said connecting rod.

7. The piston for an internal combustion engine as recited in claim 6 wherein said end member has a second passageway positioned in communication between said second coolant chamber and the engine crankcase.

8. The piston for an internal combustion engine as recited in claim 5 wherein said retaining ring has at least a second passageway in communication with said cavity.

9. The piston for an internal combustion engine as recited in claim 4 wherein said connecting rod has a central axial passageway for transporting lubricant into said cavity.

10. The piston for an internal combustion engine as recited in claim 2 further comprising a connecting rod, said connecting rod having a spherical end member positioned in said cavity, and wherein said first and second passageways are positioned in said cavity such that relative angular displacement of said connecting rod in said cavity selectively exposes or obstructs said first and second passageways.

11. A piston and connecting rod assembly for a liquid-cooled internal combustion engine, with a spherical connecting rod small-end entrained in a hollow piston body by a retention ring, a groove communicating with a reservoir, an upper portion of said small end, and a coolant gallery, in a piston crown, for continuous interchange of lubricant, between said gallery and said reservoir with lubricant return, over said small end and associated spherical bearing surfaces to a central cavity, and then to the retention ring and through lubricant passages in said ring to an engine crankcase, wherein an overall circulatory lubricant feed and drainage path is provided in said piston and connecting rod assembly.

12. The piston and connecting rod assembly as recited in claim 11 further comprising a lubricant passage in said connecting rod small end for the return of lubricant to a hollow internal region in said small end.

13. An internal combustion engine incorporating a piston and connecting rod assembly as set forth in claim 11.

14. The internal combustion engine as recited in claim 13 wherein said engine is a two-stroke combustion cycle engine.

15. The internal combustion engine as recited in claim 13 wherein said engine is a compression-ignition diesel combustion cycle engine.

* * * * *